United States Patent
Harding et al.

(10) Patent No.: US 10,399,399 B1
(45) Date of Patent: Sep. 3, 2019

(54) TRAILER JACK TAILGATE PROTECTOR

(71) Applicants: Lawrence V. Harding, Clarkston, MI (US); Matt A. Peters, Prescott Valley, AZ (US)

(72) Inventors: Lawrence V. Harding, Clarkston, MI (US); Matt A. Peters, Prescott Valley, AZ (US)

(73) Assignee: PRACTICAL INNOVATION PEOPLE CO., Auburn Hills, MI (US)

( * ) Notice: Subject to any disclaimer, the term of this patent is extended or adjusted under 35 U.S.C. 154(b) by 0 days.

(21) Appl. No.: 16/113,426

(22) Filed: Aug. 27, 2018

(51) Int. Cl.
  *B60D 1/01* (2006.01)
  *B60D 1/60* (2006.01)
  *B60D 1/66* (2006.01)

(52) U.S. Cl.
  CPC ............... *B60D 1/605* (2013.01); *B60D 1/66* (2013.01)

(58) Field of Classification Search
  CPC ...... B66F 1/00; B66F 1/06; B66F 3/00; B66F 3/24; B66F 5/00; B66F 7/00
  See application file for complete search history.

(56) References Cited

U.S. PATENT DOCUMENTS

| | | | | |
|---|---|---|---|---|
| 3,993,286 A * | 11/1976 | Greene | ................... | B66F 5/04 254/8 B |
| 4,848,735 A * | 7/1989 | Pittman | ................... | B60S 9/04 254/420 |
| 6,375,160 B1 * | 4/2002 | Hung | ................... | B66F 5/00 254/133 R |
| 8,783,660 B1 * | 7/2014 | Riddle | ................... | B60S 11/00 254/418 |
| 8,960,645 B1 * | 2/2015 | Stewart | ................... | B64F 5/40 254/133 R |
| 2005/0218384 A1 * | 10/2005 | Hernandez, Jr. | ................... | B66F 5/04 254/10 B |
| 2010/0213427 A1 * | 8/2010 | Trowbridge | ................... | B60D 1/06 254/420 |
| 2013/0087749 A1 * | 4/2013 | Hsieh | ................... | B60S 9/08 254/100 |
| 2018/0029430 A1 | 2/2018 | Abernethy, Jr. et al. | | |

* cited by examiner

*Primary Examiner* — Lee D Wilson
(74) *Attorney, Agent, or Firm* — Warn Partners, P.C.

(57) ABSTRACT

A trailer jack protection arrangement that includes a cushioned plastic or rubber surface in the event of contact between a trailer jack and a portion of the vehicle, such as a tailgate. The arrangement is attached to the trailer jack via the jack stem and projects above the jack handle or jack top cylinder, depending on the type of jack. The arrangement utilizes an embedded metal stamping to provide a mounting surface and extra stability for the plastic or rubber impact surfaces. The arrangement also utilizes a Teflon® washer underneath it for lubricity and stability when it also turns as the jack handle turns to move the trailer up or down, on a top wind jack. The alternative design provides protection for a side wind jack using an adapter, which can have several different forms to accommodate all types of trailer jacks. The design requires installation and prevents easy removal of the invention so it is not lost or stolen.

19 Claims, 7 Drawing Sheets

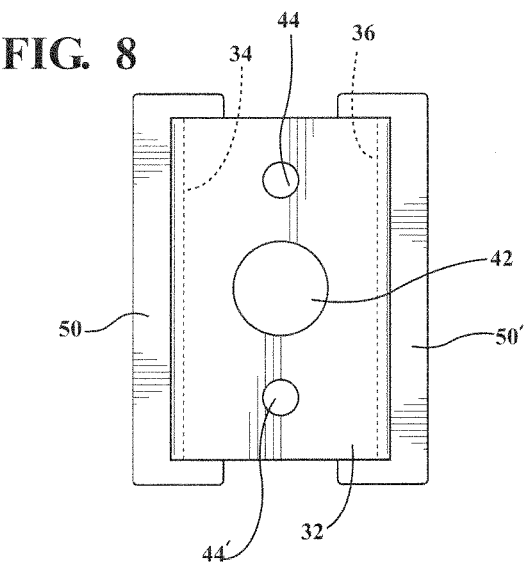
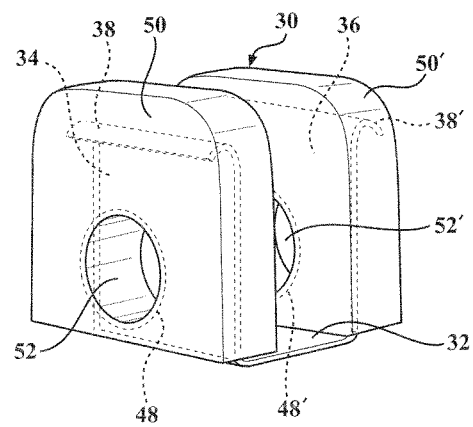
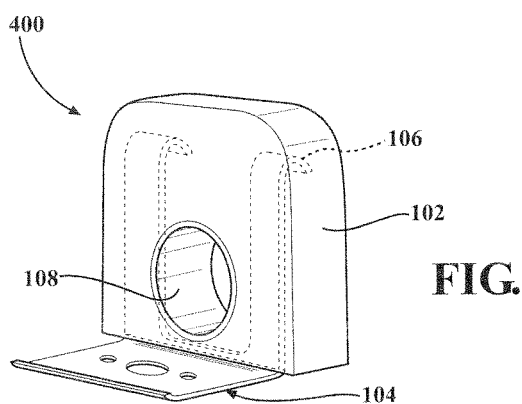

TRAILER JACK TAILGATE PROTECTOR

FIELD OF THE INVENTION

The present invention relates to a protector device that connects to the top of a trailer jack and protects objects, such as a tailgate, from striking and being damaged by the trailer jack.

BACKGROUND OF THE INVENTION

In the transportation field trailers are often used for many different purposes. Trailers are typically towed behind vehicles by being connected to a trailer hitch or ball, which is at or near the rear bumper of the vehicle. In order to take the trailer off of the trailer hitch oftentimes trailer jacks are implemented in the area of the trailer called the tongue. Trailer jacks come in many forms, but common trailer jacks include a telescoping leg that supports the front portion of the trailer, and raises it up above the ball of the trailer hitch to disconnect the trailer from the trailer hitch ball that is connected to the vehicle. The trailer jack moves telescopically by having a leg portion that slides in and out of a sleeve by rotating a handle that is connected to a worm drive. Sometimes motors are used instead of a handle. The top portion or body portion of the trailer jack creates a damage hazard, typically when the towing vehicle has a tailgate, lift gate or door that can strike the top or body portion of the trailer jack. This is especially true with pickup truck tailgates that can pivot downward and strike the top portion of a trailer jack and become dented or scratched. It is therefore an object of the present invention to protect the vehicle and the jack from damage.

SUMMARY OF THE INVENTION

It is an object of the present invention to provide a cushioned plastic or rubber surface in the event of contact between a trailer jack and a portion of the vehicle, such as a tailgate, door or lift gate. It is further an object of the present invention to provide an arrangement that is attached to the trailer jack via the jack stem and projects above the jack handle or jack top cylinder, depending on the type of jack. The device utilizes an embedded metal stamping to provide a mounting surface and extra stability for the plastic or rubber impact surfaces. The device also utilizes a Teflon® washer underneath it for lubricity and stability when it also turns as the jack handle turns to move the trailer up or down, on a top wind jack. The alternative design provides protection for a side wind jack. Adapters can be produced for all types of trailer jacks. The design requires installation and prevents easy removal of the invention so it is not lost or stolen.

The present invention is directed to a trailer jack protector arrangement that is connectable to the top portion of a trailer jack. The trailer jack protector arrangement includes a bracket having a base portion and two vertically extending portions that extend at a substantially perpendicular angle away from the base portion. The base portion includes a post hole formed therethrough, which is used to receive a post of a top winding trailer jack, which will be discussed in greater detail below. The base portion also has two connector holes formed through the base portion, which are used for connecting the bracket to an adapter, which will be described in greater detail below. The bracket is typically formed of stamped metal, however it can be formed of other materials such as glass reinforced plastics. Each of the two vertically extending portions have a top edge and also include a hole formed through each one of the two vertically extending portions.

A bumper portion is disposed on each one of the two vertically extending portions and is formed in a way that each bumper portion extends past the top edge of the respective one of the two vertically extending portions in order to eliminate any sharp edges. Each bumper portion also has a hole formed through the bumper that is aligned with the respective hole formed through each one of the two vertically extending portions. The purpose of the hole through the bumper and the hole through the vertically extending portions allows for the connection of a trailer jack handle in the space between the two bumper portions, which requires a fastener to pass through the holes and connect the handle to the post.

Other areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 8 depicts a bottom plan view of a trailer jack protector arrangement according to a first embodiment of the invention.

FIG. 9 depicts a side perspective view of a trailer jack protector arrangement according to the first embodiment of the invention.

FIG. 10 depicts a side perspective view of a trailer jack protector arrangement according to an alternate embodiment of the invention.

DETAILED DESCRIPTION OF THE PREFERRED EMBODIMENTS

The following description of the preferred embodiment(s) is merely exemplary in nature and is in no way intended to limit the invention, its application, or uses.

Figure 1:
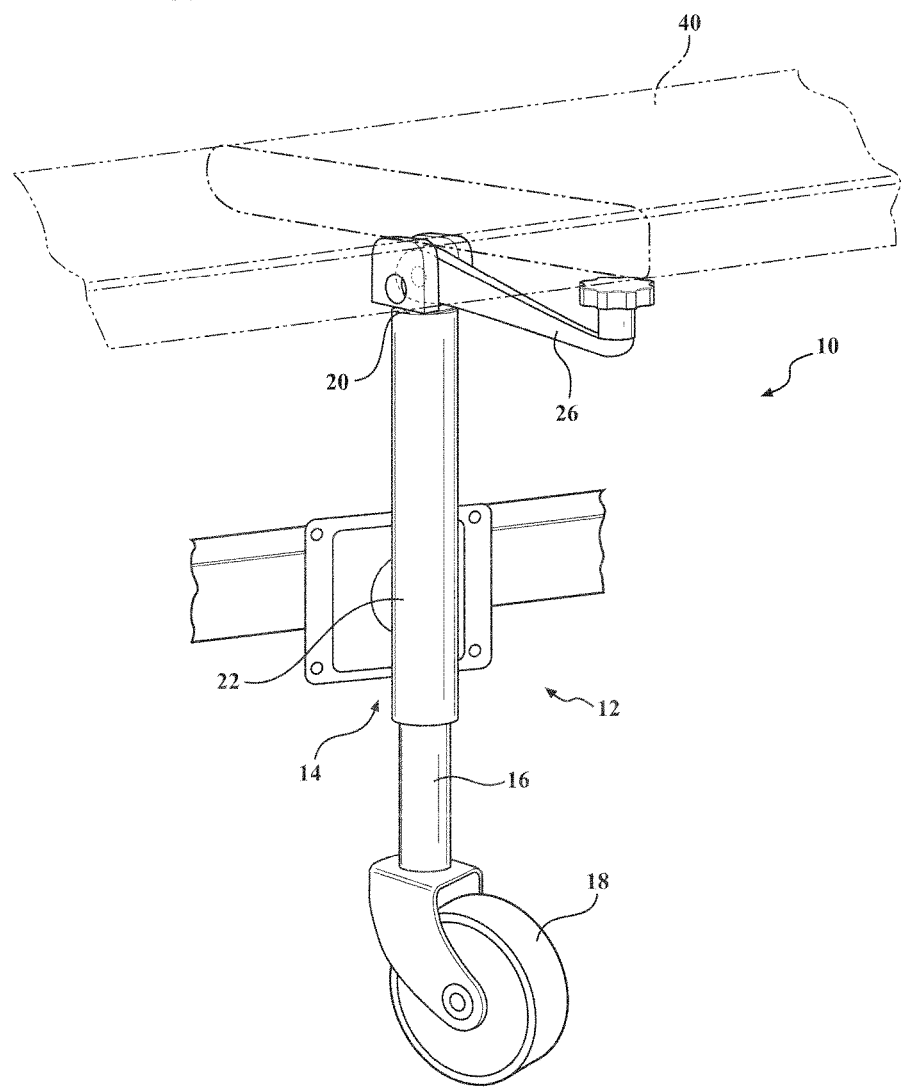
FIG. 1 depicts a perspective view of a trailer jack protector arrangement for a top winding trailer jack according to a first embodiment of the invention.
Figures 3, 4:
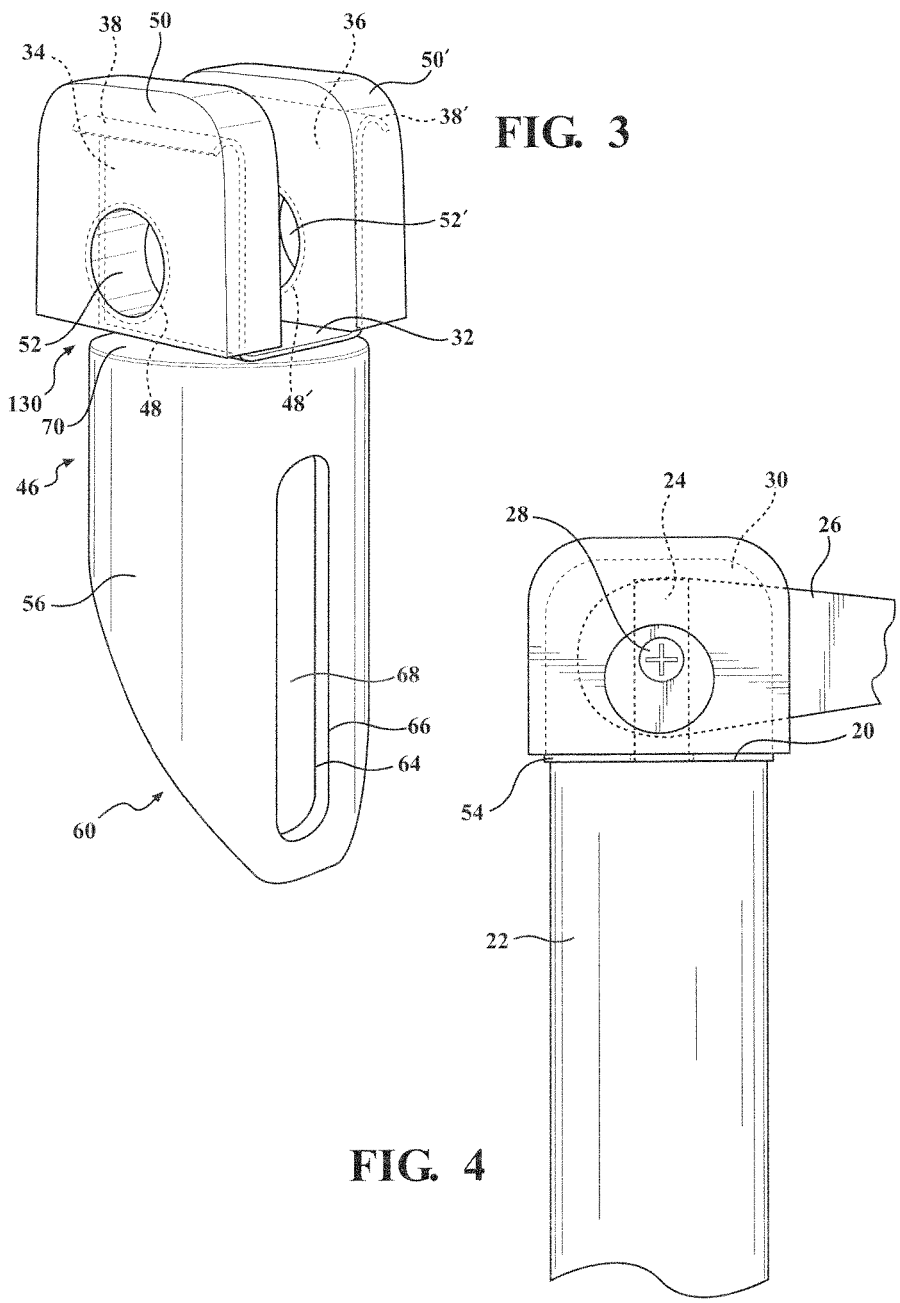
FIG. 3 depicts an enlarged side perspective view of a trailer jack protector arrangement according to a second embodiment of the invention.
FIG. 4 depicts an enlarged side view of a trailer jack protector arrangement on a top winding trailer jack according to a first embodiment of the invention.
Figure 5:
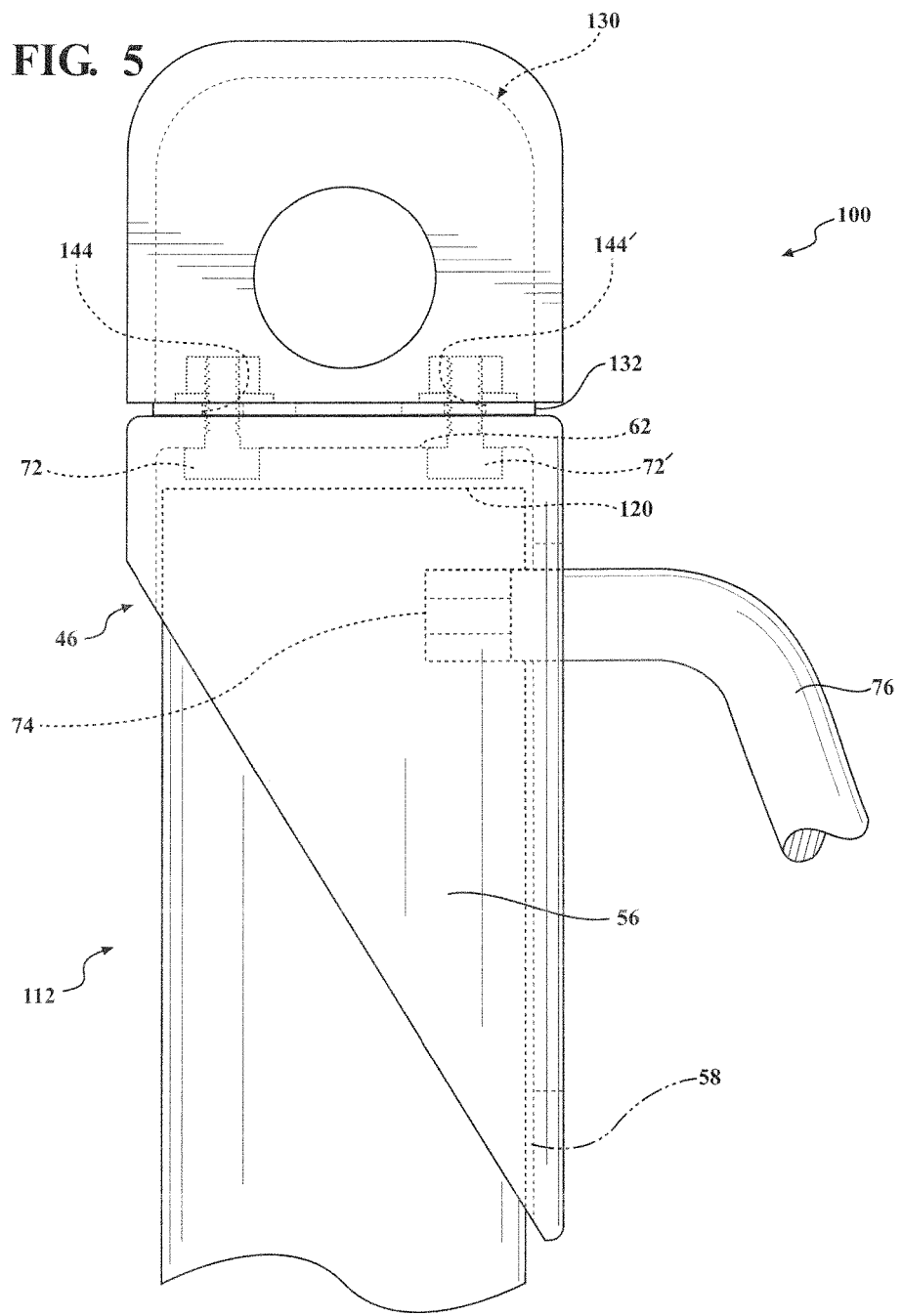
FIG. 5 depicts an enlarged side view of a trailer jack protector arrangement on a side winding trailer jack according to a second embodiment of the invention.
Figure 6:
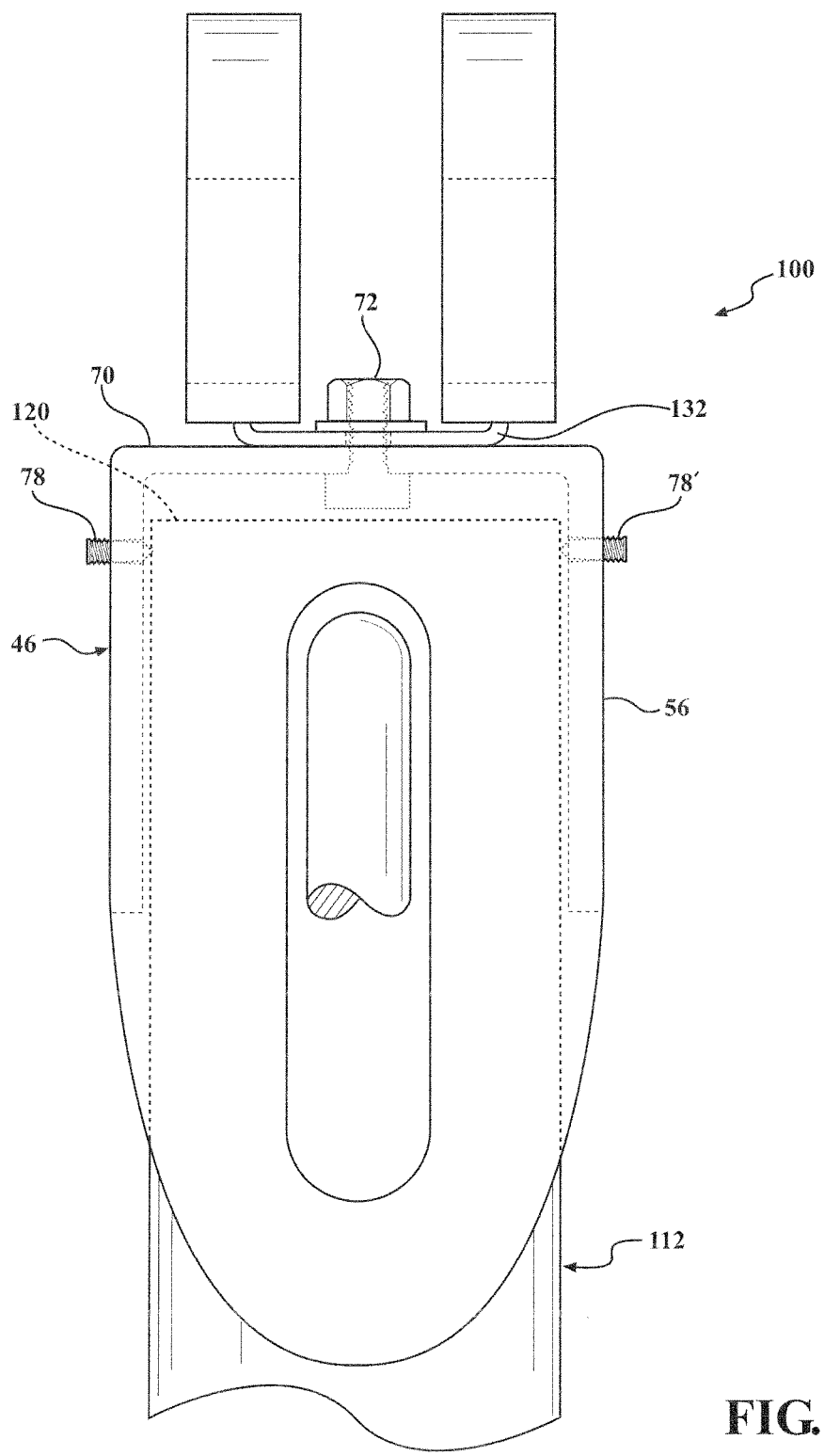
FIG. 6 depicts an enlarged side view of a trailer jack protector arrangement on a side winding trailer jack according to a second embodiment of the invention.

FIGS. 1 and 4 depict a trailer jack protector arrangement 10 located on top of a trailer jack 12 in accordance with the embodiments of the inventions. The trailer jack 12 includes an outer sleeve 14 that slidably receives an inner leg 16. At one end of the inner leg 16 is a wheel 18 that is pivotally mounted. While a wheel 18 is shown it is possible to have a fixed foot or other component. The outer sleeve 14 houses an actuation mechanism, such as a worm drive (not shown) that moves the inner leg 16 between an extended and retracted position within the outer sleeve 14. The outer sleeve 14 includes a top portion 20 and side portion 22. In the present embodiment the trailer jack protector arrangement 10 is what is referred to as a top winding trailer jack because there is a post 24 extending upward from the top portion 20 of the outer sleeve 14, which is connected to the actuation mechanism. The post 24 is used to connect a handle 26 by way of a fastener 28. The handle 26 actuates the trailer jack 12 by rotating 360 degrees around to cause the actuation mechanism to move the inner leg 16 between the extended and retracted positions.

Figure 2:
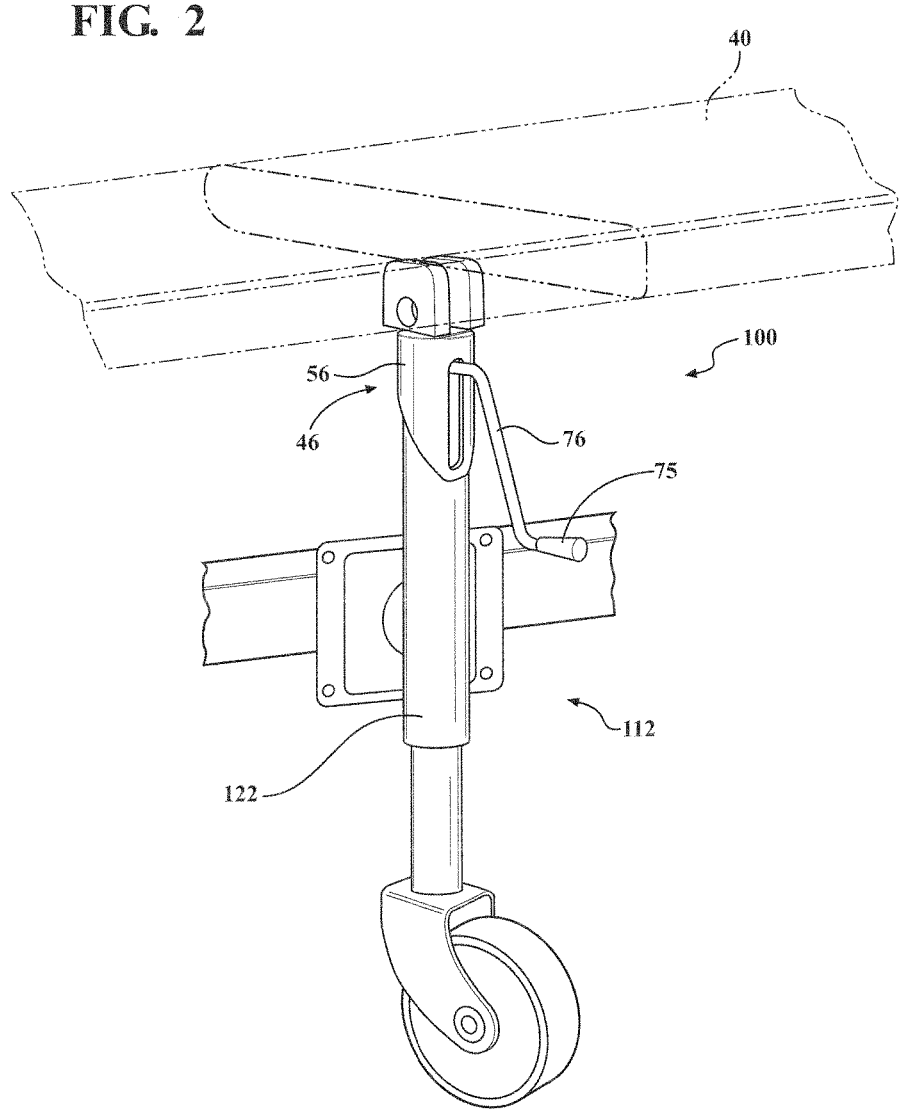
FIG. 2 depicts a perspective view of a trailer jack protector arrangement for a side winding trailer jack in accordance with a second embodiment of the invention.

As shown in FIG. 1 the trailer jack protector arrangement 10 includes a bracket 30 that is formed of stamped metal. While metal is described it is within the scope of this invention for different materials to be used. Referring briefly to FIG. 9 the bracket 30 includes a base portion 32 and two vertically extending portions 34, 36 that extend at a substantially perpendicular angle away from the base portion 32. The ends of the two vertically extending portion 34, 36 have a rounded edge or curled portions 38, 38' that eliminate a blunt upwardly facing edge as shown in FIG. 9. The curled portions 38, 38' eliminate a pressure point if an object such as a tailgate 40 strikes the top of the bracket 30 as shown in FIGS. 1 and 2. Referring briefly to FIG. 8 a bottom view of the bracket 30 of the base portion 32 is shown. The base portion 32 includes a post hole 42 and two connector holes 44, 44' of the base portion, which are used for connecting the bracket 30 to and an adapter 46 which is described in an alternate embodiment of a trailer jack protector arrangement 100, described below with regard to FIGS. 2, 3, 5 and 6.

Each of the two vertically extending portions 34, 36 have an opening 48, 48' formed therethrough, the purpose of which will be described below. About each of the two vertically extending portions 34, 36 in a bumper portion 50, 50' that is disposed thereon and is formed by an overmolding process. The overmolding process embeds each of the two vertically extending portions 34, 36 within the material of the respective bumper portion 50, 50'. Each bumper portion 50, 50' can be formed of many different types of materials, however it is within the scope of this invention for the materials to include one from the group consisting essentially of plastics, polyvinyl chloride, silicone, polyurethane foam and rubber. Each bumper portion 50, 50' extends past the top edge of the respective one of the two vertically extending portions 34, 36 to which the respective bumper portion 50, 50' is disposed.

Each bumper portion 50, 50' has a hole 52, 52' that extends through the respective bumper portion 50, 50' and also aligns with the respective opening 48, 48' of the one of the two vertically extending portions 34, 36 to which the bumper portion 50, 50' is disposed thereon. This allows for the post 24 of the trailer jack 12 to extend through the post hole 42 in the base portion 32. This aligns the post 24 within the holes 52, 52' extending through the bumper portion 50, 50' and the opening 48, 48' extending through the respective vertically extending portions 34, 36 so that the handle 26 can be connected to the post 24. Connecting the handle 26 to the post 24 connects the bracket 30 to the top portion 20 of the trailer jack 12. The bracket 30 will then rotate with the handle 26 and the post 24. In order to prevent unwanted friction between the top portion 20 of the trailer jack 12 and the bottom of the base portion 32 of the bracket 30, a washer 54 (shown in FIG. 4), which is made of friction reducing material or other suitable material can be positioned there between. As shown the washer 54 in the present embodiment can be a Teflon® washer that the bracket 30 will rotate upon.

Referring now to FIGS. 2, 3, 5 and 6 a trailer jack protector arrangement 100 in accordance with the second embodiment the invention will now be described. Reference numerals similar to those used in the first embodiment will be used differing by 100. In this particular embodiment of the invention there is a trailer jack 112 that is referred to as a side wind trailer jack. The difference between the trailer jack 112 in this embodiment and the trailer jack 12 shown in FIG. 1 is that trailer jack 112 is what is commonly referred to as a side wind trailer jack. This means that there is a handle body 76 connected through a side portion 122 of the trailer jack 112, rather than being connected to a post as shown and described in the first embodiment of the invention, shown in FIG. 1. Since this particular embodiment is a side wind, the trailer jack protector arrangement 100 further includes the adapter 46. The adapter 46 has a sleeve portion 56 that forms a hollow cavity 58 within opening 60 at one end and a closed end 62 at a second end of the sleeve portion 56. The adapter 46 has an inside surface 64 that defines the hollow cavity 58 and an outside surface 66 of the sleeve portion 56 of the adapter 46. An optional feature of the present invention includes using multiple set screws 78, 78' that extend through the sleeve 56 of the adapter 46 in order to make contact with the trailer jack and hold the adapter 46 in place. The set screws 78, 78' allow the adapter 46 to be adjusted to accommodate trailer jack models where the outer sleeve 122 can have different diameters between models.

There is an aperture 68 formed through the sleeve portion 56, which is an elongated slot that extends between the outside surface 66 to the inside surface 64 of the sleeve portion 56 of the adapter 46. There is also an outside surface 70 of the closed end 62 of the adapter 46, where the bracket 130, which is identical to the bracket 30 in FIG. 4. In the present embodiment bracket 130 is connected to the outside surface 70 of the closed end of the adapter 46 using fasteners 72, 72' positioned in each one of two connector holes 144, 144' of the base portion 132 of a bracket 130.

In this particular embodiment the adapter 46 is configured to slide over a top portion 120 of the trailer jack 112 so a portion of the trailer jack 112 slides into the hollow cavity 58 of the adapter 46 such that the closed end 62 of the adapter 46 can act as a stop and if necessary make contact with the top portion 120 of the trailer jack 112. The aperture 68 formed through the sleeve portion 56 is aligned with a side wind connection 74 of the trailer jack 112 that receives a handle body 76. At the end of the handle body 76 is a handle 75 that is removed from the handle body 76 during connection of the adapter 46 to the trailer jack 112 because the handle 75 has too large of a diameter or size to pass through the aperture 68. However, the aperture 68 is of appropriate size to allow the handle body 76 to pass through the aperture 68. Thus when the handle 75 is reconnected to the handle body 76 the adapter 46 cannot be removed without removing the handle 75, which can require tools to disconnect. This creates a theft deterrent feature since the adapter 46 cannot be easily removed without tools.

The aperture 68 of the adapter 46 has an elongated slot that has a rectangle or shape with semi circles at opposing ends of the rectangle. This allows for accommodating different styles of sidewind jacks where the sidewind connection may be located at a different location along the length of the outer sleeve of the trailer jack 112.

Figure 7:
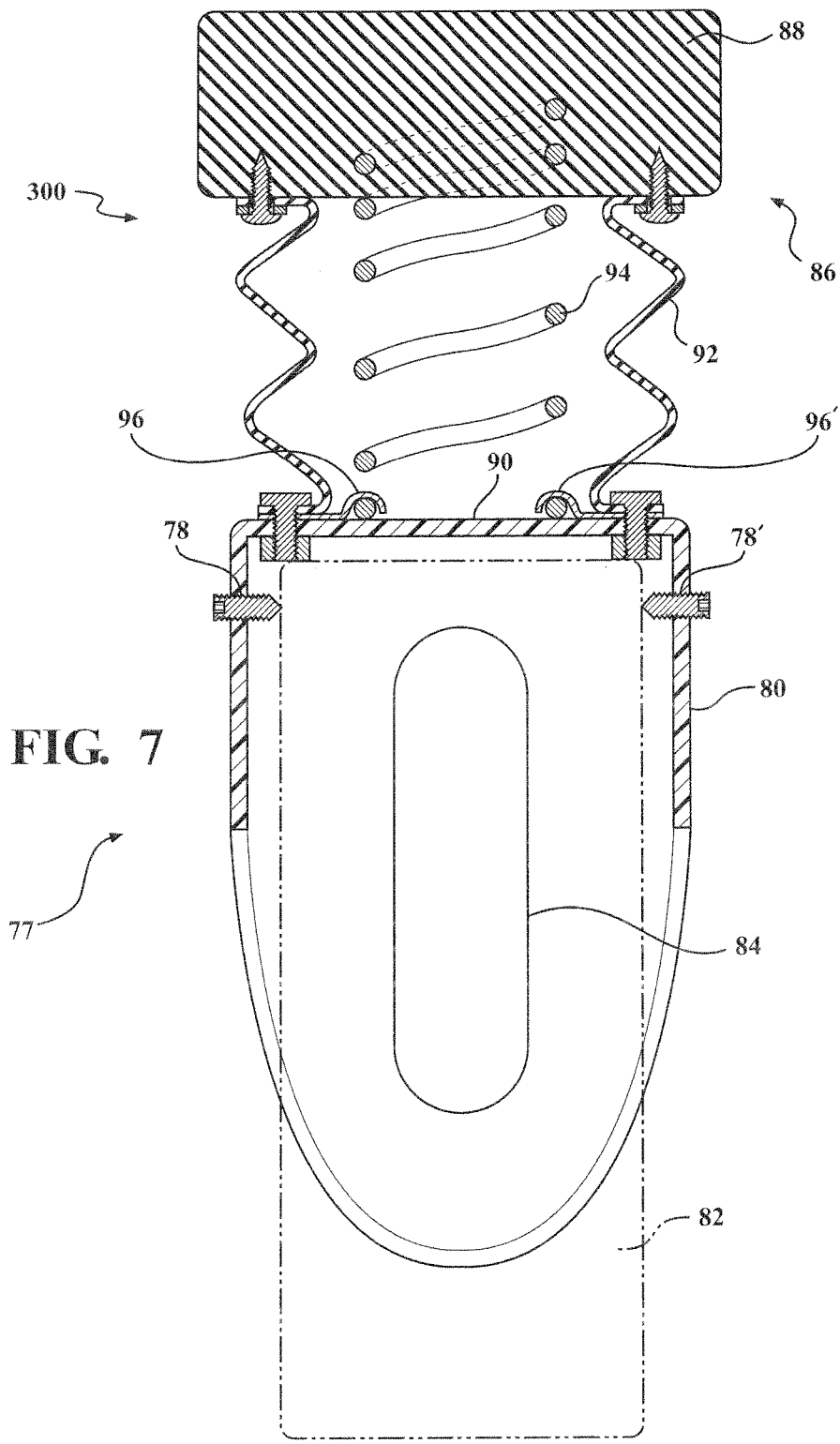
FIG. 7 depicts an enlarged side view of a trailer jack protector arrangement according to a third embodiment of the invention.

Referring now to FIG. 7 another alternate embodiment of the invention is described. In this particular embodiment of the invention there is a trailer jack protection arrangement 300 that has an adapter 77 that is able to accommodate trailer jacks having different diameters. The accommodation of the different diameters is accomplished by using multiple set screws 78, 78' that extend through a sleeve 80 of the adapter 77 in order to make contact and hold the adapter 77 in place along the length of a trailer jack 82. The number of set screw 78, 78' can vary depending on the particular application and can include a single set screw, two, three, four or any number of set screws depending on the need of a particular application. This particular embodiment is for a side wind type jack only and also includes the elongated slot 84 that is similar to and serves the same function as the aperture 68 described in the second embodiment of the invention. This embodiment of the invention also includes a bumper mechanism 86 that includes a soft bumper 88 connected to a top portion 90 of the adapter 77 using a boot 92 that is positioned about a spring 94. A spring retainer 96, 96' holds one end of the spring while a second end of the spring extends upward and rests on the bottom portion of the bumper. The boot 92 prevents a user from coming into contact with the spring 94 which can pinch objects such as fingers or skin. This particular embodiment provides a softer surface for a tailgate to make contact with sense the resilient spring will compress when the soft bumper 88 contacts an object, which will cushion the initial striking of an object such as a tailgate against the trailer jack protection arrangement 300.

Referring now to FIG. 10 there is depicted an alternate embodiment of a trailer jack protection arrangement 400. The trailer jack protection arrangement 400 can be used for either a top wind, side wind or any other configuration that will benefit from having a single bumper 102 instead of two bumpers as shown in the other embodiments of the invention. The use of the single bumper 102 is particularly needed in top wind jack configurations where the handle itself or the connection mechanism between the top post and handle are too large to fit between the bumper portion 50, 50' shown in the other embodiments of the invention. The present embodiment of the invention also shows a bracket 104 having a vertically extending U-portion 106, which makes it easier to create a hole 108 in the single bumper 102 because it eliminates the need to align a hole in the bracket with the overmolding of the hole in the bumper. It is within the scope of this invention for the vertically extending portions 34, 36 in the bracket 30, 130 of the other embodiments of the invention to be configured to have a U-portion similar or identical to the vertically extending U-portion 106 shown and described with respect to the present invention.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A trailer jack protector arrangement comprising:
    a trailer jack having an outer sleeve with a top portion and side portion, the outer sleeve slidably receives an inner leg;
    an actuation mechanism in the outer sleeve that moves the inner leg between an extended position and a retracted position within the outer sleeve;
    a post extending upward from the top portion of the trailer jack, the post is connected to the actuation mechanism in the outer sleeve of the trailer jack;
    a bracket having a base portion and at least one vertically extending portion that extends at a perpendicular angle away from the base portion and the top portion of the trailer jack and the at least one vertically extending portion has a top edge;
    at least one hole in the base portion, wherein the post of the trailer jack goes through the at least one hole of the base portion and a handle is connected to the post using a fastener that is connected to the post thereby connecting the bracket to the top portion of the trailer jack;
    at least one elastomeric bumper portion disposed on the at least one vertically extending portion so that the at least one elastomeric bumper portion extends past the top edge of the at least one vertically extending portion.

2. The trailer jack protector arrangement of claim 1 wherein the at least one elastomeric bumper portion is formed of one of the group consisting essentially of plastic, polyvinyl chloride, silicone, polyurethane foam and rubber.

3. The trailer jack protector arrangement of claim 1 further comprising:
    a hole extending through the at least one elastomeric bumper portion;
    wherein the handle is connected to the post by positioning the fastener through the hole of the at least one elastomeric bumper portion.

4. The trailer jack protector arrangement of claim 3 further comprising a friction ring positioned between the base portion of the bracket and the top portion of the trailer jack, wherein the friction ring allows the bracket to rotate about the post, while reducing the friction and contact between the bracket and the top portion of the trailer jack.

5. A trailer jack protector arrangement comprising:
    a trailer jack having an outer sleeve with a top portion and side portion, the outer sleeve slidably receives an inner leg;
    an actuation mechanism in the outer sleeve that moves the inner leg between an extended position and a retracted position within the outer sleeve;
    an adapter having a sleeve portion forming a hollow cavity with an opening at one end and a closed end at a second end of the sleeve, such that the adapter has an inside surface defining the hollow cavity and an outside surface of the sleeve portion, wherein the adaptor slides over the top of the outer sleeve of the trailer jack-so a portion of the trailer jack slides into the hollow cavity of the adapter such that the closed end of the adapter contacts the top portion of the trailer jack;
    an aperture formed through the sleeve portion between the outside surface to the inside surface;
    an outside surface of the closed end of the adapter;
    a bracket having a base portion and at least one vertically extending portion that extends at a perpendicular angle away from the base portion and the top portion of the trailer jack and the at least one vertically extending portion has a top edge;
    at least one hole in the base portion, wherein the bracket is connected to the outside surface of the closed end of the adapter by a fastener positioned through the at least one hold in the base portion, and
    at least one elastomeric bumper portion disposed on the at least one vertically extending portion so that the at least one elastomeric bumper portion extends past the top edge of the at least one vertically extending portion.

6. The trailer jack protector arrangement of claim 5 further comprising:
a sidewind connection located on the side portion of the trailer jack;
a handle is rotatably connectable to the side portion of the trailer jack, and
wherein when the adapter slides over the top portion of the trailer jack the aperture formed through the sleeve portion of the adapter is aligned with the sidewind connection of the jack so that the handle can be connected to the sidewind connection through the aperture of the adapter.

7. The trailer jack protector arrangement of claim 5 wherein the aperture is an elongated slot having a rectangular shape with semi circles at opposing ends of the rectangle.

8. The trailer jack protector arrangement of claim 1 wherein the top edge of the at least one vertically extending portion is curled.

9. The trailer jack protection arrangement of claim 1 wherein the at least one vertically extending portion has a hole extending through the at least one vertically extending portion, which aligns with the hole of the at least one elastomeric bumper portion.

10. The trailer jack protection arrangement of claim 1 wherein the at least one hole in the base portion of the bracket includes one post hole and two connector holes, wherein the one post hole is used to receive a post from a top wind trailer jack.

11. The trailer jack protection arrangement of claim 9 wherein the two connector holes are used to connect the bracket to an adapter for connection to a side sidewind trailer jack.

12. A trailer jack protector arrangement comprising:
a trailer jack having an outer sleeve with a top portion and side portion, the outer sleeve slidably receives an inner leg;
an actuation mechanism in the outer sleeve that moves the inner leg between an extended position and a retracted position within the outer sleeve;
a post extending upward from the top portion of the trailer jack, the post is connected to the actuation mechanism in the outer sleeve of the trailer jack;
a bracket having a base portion and two vertically extending portions that extend at a substantially perpendicular angle away from the base portion, wherein each of the two vertically extending portions have a hole formed through each of the two vertically extending portions and the two vertically extending portions each have a top edge;
a post hole formed through the base portion of the bracket and two connector holes formed through the base portion of the bracket, wherein the post of the trailer jack goes through the at least one hole of the base portion and a handle is connected to the post using a fastener that is connected to the post thereby connecting the bracket to the top portion of the trailer jack;
an elastomeric bumper portion disposed on each one of the two vertically extending portions, wherein each elastomeric bumper portion extends past the top edge of the respective one of the two vertically extending portions to which the elastomeric bumper portion is disposed.

13. The trailer jack protector arrangement of claim 12 wherein the elastomeric bumper portion is formed of one of the group consisting essentially of plastic, polyvinyl chloride, silicone, polyurethane foam and rubber.

14. The trailer jack protector arrangement of claim 12 further comprising:
a hole extending through the at least one elastomeric bumper portion;
wherein the handle is connected to the post by positioning the fastener through the hole of the elastomeric bumper portion.

15. The trailer jack protector arrangement of claim 14 further comprising a friction ring positioned between the base portion of the bracket and the top portion of the trailer jack, wherein the friction ring allows the bracket to rotate about the post, while reducing the friction and contact between the bracket and the top portion of the trailer jack.

16. The trailer jack protector arrangement of claim 12 further comprising an adapter having a sleeve portion forming a hollow cavity with an opening at one end and a closed end at a second end of the sleeve, such that the adapter has an inside surface defining the hollow cavity and an outside surface of the sleeve portion;
an aperture formed through the sleeve portion between the outside surface to the inside surface; and
an outside surface of the closed end of the adapter, wherein the bracket is connected to the outside surface of the closed end of the adapter by using a fastener positioned in each one of the two connector holes of the base portion.

17. The trailer jack protector arrangement of claim 16 further comprising:
a trailer jack having a top portion and a side portion with a sidewind connection,
a handle is rotatably connectable to the side portion of the trailer jack, and
wherein the adapter is configured to slide over the top portion of the trailer jack so a portion of the trailer jack slides into the hollow cavity of the adapter such that the closed end of the adapter contacts the top portion of the trailer jack and the aperture formed through the sleeve portion of the adapter is aligned with the sidewind connection of the jack so that the handle can be connected to the sidewind connection through the aperture of the adapter.

18. The trailer jack protector arrangement of claim 17 wherein the aperture is an elongated slot having a rectangular shape with semi circles at opposing ends of the rectangle.

19. The trailer jack protector arrangement of claim 12 wherein the top edge of the at least one vertically extending portion is curled.

* * * * *